United States Patent [19]

Long et al.

[11] Patent Number: 5,101,941
[45] Date of Patent: Apr. 7, 1992

[54] HYDRAULIC RETARDER AND CONTROL

[75] Inventors: Charles F. Long, Indianapolis; Martin R. Dadel, Plainfield, both of Ind.

[73] Assignee: General Motors Corporation, Detroit, Mich.

[21] Appl. No.: 599,198

[22] Filed: Oct. 17, 1990

[51] Int. Cl.⁵ .............................. F16D 57/02
[52] U.S. Cl. ..................... 188/290; 60/337; 188/274; 192/4 B
[58] Field of Search .............. 188/290, 291, 292, 293, 188/294, 295, 296, 274, 264 E, 264 P, 264 R, 264 D; 192/4 B; 60/436, 366, 347, 337, 357, 445, 465, 329, 336

[56] References Cited

U.S. PATENT DOCUMENTS

| | | | |
|---|---|---|---|
| 3,814,221 | 6/1974 | Fuehrer | 192/4 B X |
| 3,858,459 | 1/1975 | Fuehrer et al. | 192/4 B |
| 3,863,739 | 2/1975 | Schaefer et al. | 188/274 X |
| 3,931,870 | 1/1976 | Memmer | 192/4 B X |

Primary Examiner—Douglas C. Butler
Attorney, Agent, or Firm—Donald F. Scherer

[57] ABSTRACT

A hydraulic retarder is disposed to receive fluid as directed by a flow valve to selectively retard vehicle motion. The flow valve responds to an operator controlled modulator valve to direct fluid from a cooler which is supplied from a torque converter to the hydraulic retarder upon a request by the operator. A modulator valve is also effective to control the pressure of the fluid exiting the cooler and entering the retarder.

2 Claims, 1 Drawing Sheet

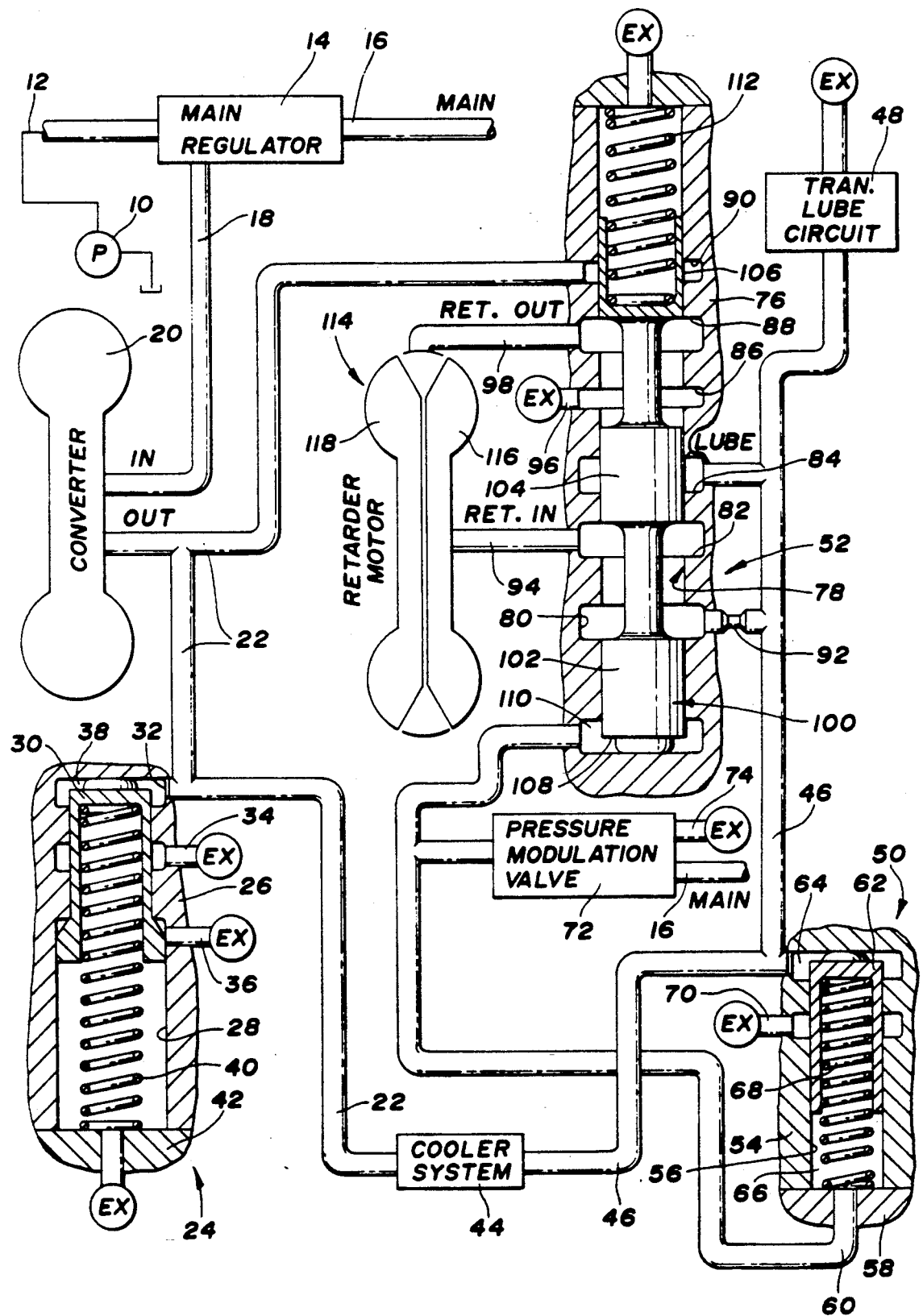

HYDRAULIC RETARDER AND CONTROL

BACKGROUND OF THE INVENTION

This invention relates to hydraulic retarders and controls, and more particularly, to hydraulic retarders and controls for establishing a fluid flow path to and from a retarder and a lube pressure valve which is selectively controlled to establish the inlet pressure to the retarder.

SUMMARY OF THE INVENTION

It is an object of this invention to provide an improved hydraulic retarder and fluid control wherein the fluid flow to and from the hydraulic retarder is connected with the outlet flow of a torque converter through a directional flow control valve, and also wherein the inlet pressure to the retarder is selectively controlled by the pressure regulator valve, the normal function of which is to control lube pressure.

It is another object of this invention to provide an improved hydraulic retarder and control wherein a hydraulic retarder and a hydrodynamic torque converter are disposed for fluid interconnection through a directional flow control valve which is selectively controlled to connect the retarder outlet to exhaust when retardation is not requested, and to connect the hydraulic retarder outlet to the torque converter outlet and the retarder inlet to free flow from the cooler outlet, and also wherein a pressure regulator valve is disposed in fluid communication with the cooler outlet to control the fluid pressure at a first level when retardation is not requested, and a second level when retardation is requested, and further wherein an operator controlled valve is disposed to selectively control both the directional flow control valve and the pressure regulator valve in accordance with a retardation request.

These and other objects and advantages of the present invention will be more apparent from the following description and drawing.

DESCRIPTION OF THE DRAWING

The drawing is a diagrammatic representation of a hydraulic retarder and control system.

DESCRIPTION OF AN EXEMPLARY EMBODIMENT

Referring to the drawing, there is seen a hydraulic control system having a positive displacement control pump 10 which is operable to supply pressurized fluid through a passage 12 to a conventional regulator valve 14. The main regulator valve 14, as is well known, will establish the pressure level to be utilized in a transmission, not shown. The pressure level established by the regulator 14 is generally referred to as main pressure and is distributed to the control system through a passage 16. When the pressure level of passage 16 is satisfied, the regulator valve 14 supplies fluid pressure to a torque converter 20 inlet passage 18. Any excess fluid, over the requirement of the system and converter 20, delivered by the pump 10 is exhausted to a sump, not shown. The pressurized fluid in passage 18 is delivered to the conventional hydrodynamic torque converter 20 which is operatively connected to an engine, not shown, and to a power transmission, not shown.

As is well known, the torque converter 20 will provide a fluid drive between the engine and transmission which is effective to provide torque multiplication in one range of operation and substantially 1:1 torque transmission in another or coupling phase of operation. These elements, including the engine, torque converter and transmission are conventional power train elements which are well known and are not believed to need further explanation at this point.

The torque converter 20 accepts fluid from the inlet passage 18 and exhaust fluid through an outlet or discharge passage 22. The maximum pressure level in the discharge passage 22 is established by a converter pressure regulator valve, generally designated 24. The regulator valve 24 includes a housing 26 in which is formed a stepped diameter bore 28, which in turn received a stepped diameter piston 30. The stepped diameter bore 28 has an inlet port 32 and a pair of exhaust ports or passages 34 and 36 which are connected to the transmission sump. The piston 30 cooperates with the bore 28 to provide a chamber 38 which is in fluid communication with the passage 22 via port 32.

A spring member 40 is compressed between an end cap or cover 42 and the piston 30 and is effective to urge the piston to reduce the size of the chamber 38. If the discharge pressure or outlet pressure from the converter 20 operating on the piston 30 is sufficient to overcome the force in spring 40, the piston 30 will move toward the end cover 42 until the exhaust passage 34 is opened thereby preventing further development of pressure in the passage 22. The exhaust passage 36 prevents the buildup of pressure in the stepped diameter portion of the bore 28.

If desired, the exhaust passage 36 can be utilized as a pressure control passage in which case the passage 36 would be disposed in communication with a pilot valve which would permit the operator or an automatic control to establish a controlled pressure at the area differential defined by the stepped diameter 28. The pressure in this area would be effective to vary the outlet pressure of the torque converter 20 and thereby control the maximum pressure in passage 22.

The fluid in passage 22 is delivered to a conventional cooler 44 which has an outlet passage 46 which is connected with a transmission lube circuit 48 to provide lubrication for the various bearings and gears and cooling fluid for the friction phases of the various clutches and brakes which are incorporated in a conventional transmission system. As is well known, the pressure of the fluid will decrease as it passes through the cooler 44. Thus, the pressure in passage 46 will be less than the pressure in passage 22. The passage 46 is also in fluid communication with a lube pressure regulator valve 50 and a directional flow control valve 52. The lube pressure regulator valve 50 includes a body 54 in which is formed a bore 56. The bore 56 is closed at one end by an end cap 58.

A passage 60 provides fluid communication with the bore 56 through the cap 58. A piston 62 is slidably disposed in the bore 56 and cooperates therewith to form a pressure chamber 64 and a control chamber 66. A compression spring 68 is disposed in the control chamber 66 and is effective to urge the piston 62 toward the pressure chamber 64. An exhaust passage 70 is also disposed in communication with the bore 56.

The passage 60 is connected with a pressure modulator valve 72 which is preferably a conventional operator controlled solenoid valve of either the on/off type or pulse-width-modulated type. Both types of these pressure modulator valves are well known. The particular type to be used depends upon the control signal desired. An on/off type control valve will generally provide either exhaust or high pressure, while a pulse-width-modulated type valve will provide an exhaust setting and a variable controlled pressure setting depending upon the duty cycle of the electrical signal imposed on the solenoid valve. The pressure modulation valve 72 can also be a mechanical type valve which will provide the same functions as the solenoid type valves.

The valve 72 is in fluid communication with the passage 60, the main passage 16 and an exhaust passage 74. By controlling the pressure modulation valve 72, the operator can establish a control pressure within the passage 60 which will be effective to establish a control pressure within the chamber 66. The reason for providing a control pressure in chamber 66 will become evident later. The passage 60 is also in fluid communication with the directional flow control valve 52.

The directional flow control valve 52 includes a valve body 76 which has formed therein a valve bore 78. The valve bore 78 is interrupted along its length by a plurality of annular port areas 80, 82, 84, 86, 88 and 90. The port 80 is in restricted fluid communication with the passage 46 via a restriction 92. The port 82 is in fluid communication with a retarder inlet passage 94. The port 84 is in free flow fluid communication with the passage 46. The port 86 is in fluid communication with an exhaust passage 96. The port 88 is in fluid communication with a retarder outlet passage 98. The port 90 is in fluid communication with the converter outlet passage 22.

The directional flow control valve 52 also includes a valve spool 100 which is slidably disposed in the valve bore 78 and has formed thereon three spaced lands 102, 104 and 106. The valve land 102 has one end thereof which cooperates with the valve bore 78 to provide a control chamber 110 which is in fluid communication with the passage 60 and therefore with the pressure modulation valve 72. The land 102 cooperates with the land 104 to control selective fluid communication between ports 80 and 82 and between ports 84 and 82. The valve lands 104 and 106 are operative to provide selective fluid communication between ports 86 and 88 and between ports 90 and 88. The valve 52 further includes a compression spring 112 which is effective to urge the valve spool 100 to the spring set position shown, wherein port 90 is closed by land 106 and port 84 is closed by land 104.

The passages 94 and 98 are in fluid communication with a conventional hydraulic retarder 114. As is well know with hydraulic retarders, one portion, for example 116, is maintained stationary while a second portion 118 is permitted to rotate with one of the power transmission members. During normal vehicle operation, when braking is not desired, the retarder 114 has very little effect on the vehicle operation. A minor amount of fluid passes through the restriction 92 during normal operation which is permitted to enter the retarder through passage 94 to provide lubrication fluid for the bushings and other surfaces within the retarder.

The retarder outlet passage 98 is connected via ports 88 and 86 to exhaust such that fluid pressure cannot develop at the retarder outlet. When the operator desires to cause deceleration of the vehicle and retardation is requested, the pressure modulation valve 72 is actuated thereby causing an increase in fluid pressure in the control chamber 110 which will result in the valve spool 100 moving to a pressure set position wherein the spring 112 is compressed further.

In the spring set position, the port 80 is closed by the land 102 and the exhaust port 96 is closed by the land 104. Simultaneously, the port 84 is open to port 82 thereby distributing fluid from the passage 64 to the retarder inlet passage 94 and also simultaneously the port 88 is connected with the port 90 thereby connecting the retarder outlet passage 98 with the converter outlet passage 22.

This movement of the directional flow control valve 52 will result in rapidly increasing the fluid flow and pressure within the hydraulic retarder 114. As is well know, the introduction of fluid in a large amount to the retarder will result in retardation of the transmission component connected to portion 118 and therefore retardation of the vehicle speed. It should be noted that both the retarder inlet 94 and retarder outlet 98 are supplied with fluid. This improves the response time of the retarder.

The prior art has generally provided for filling of the retarder with the use of an accumulation which must then be recharged and also the introduction of fluid pressure from the main hydraulic system is utilized in the prior art for supplying fluid to the retarder. As is evident with the above description, the retarder is supplied only by the fluid through the torque converter which does not diminish the flow supplied by the main regulator to passage 16 and therefore to the various transmission components.

In order for the inlet pressure to the retarder to be raised above the pressure normally found in the lube circuit, the fluid pressure distributed by the pressure modulation valve 72 will be effective in the control chamber 66 of the lube pressure regulator valve 50 to assist the spring 68 in opposing movement of the piston 62.

If a simple on/off valve is utilized for the pulse modulated valve 72, the pressure in chamber 66 and therefore the regulated pressure in passage 64 will be at a fixed level. This will result in a substantially fixed amount of vehicle retardation available through the hydraulic retarder 114. Should it be desirable to provide a range of vehicle retardation forces, the pressure modulation valve 72 will be the type of valve which can establish a varying pressure output dependent upon the amount of operator input. As previously discussed, these types of valves are well known, particularly the use of the pulse-width-modulated valve.

As above stated, a purely mechanical valve can be utilized and those familiar with the art will recognize that a conventional manual control throttle pressure type valve will establish a variable pressure outlet in proportion to pressure input. It should be evident from the above description, that during a retardation request by the operator, the main system pressure represented by the pressure in passage 16 will not be diminished, the flow through the cooler system 34 will not be diminished and the transmission lubrication will be continued.

The embodiments of the invention in which an exclusive property or privilege is claimed are defined as follows:

1. In combination, a hydraulic retarder comprising a retarder inlet passage means and a retarder outlet passage means; a hydraulic torque converter comprising a torque converter inlet passage means and a torque converter outlet passage means; hydraulic fluid source means for supplying pressurized fluid to said torque converter input passage means; cooler means; fluid passage means for connecting said torque converter output passage means to the cooler means; lube passage means connected downstream of the cooler means; lube regulator valve means including a control chamber for controlling fluid pressure in the lube passage means and being disposed downstream of the cooler means; first control valve means including a spool valve having a pair of ends and a control chamber adjacent one of the ends, said valve spool being movable to first and second positions for controlling fluid flow to and from the retarder inlet passage means and the retarder outlet passage means; spring means acting on the other end for urging said spool valve of said first control valve means to said first position for connecting said retarder outlet passage means to an exhaust means and connecting said retarder inlet passage means to said lube passage means for restricted flow therefrom; and second control valve means comprising a pressure modulating valve for selectively controlling fluid pressure in said control chamber of the first control valve means to move the spool valve against the spring means to said second position for simultaneously connecting said retarder outlet passage means to said torque converter outlet passage means and said retarder inlet passage means to an unrestricted flow from said lube passage means.

2. The invention defined in claim 1 further comprising means connecting said pressure modulated valve with said control chamber of said lube regulator valve means for controlling the pressure setting of the lube regulator valve means when said retarder flow control valve means is in said second position.

* * * * *